United States Patent
Subramanian et al.

(10) Patent No.: US 9,472,792 B2
(45) Date of Patent: Oct. 18, 2016

(54) DEVICES AND METHODS FOR RETAINING BATTERY CELLS OF TRACTION BATTERIES

(71) Applicant: FORD GLOBAL TECHNOLOGIES, LLC, Dearborn, MI (US)

(72) Inventors: Rajaram Subramanian, Ann Arbor, MI (US); Brian Utley, Canton, MI (US); Yongcai Wang, Troy, MI (US); LeeAnn Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 14/284,319

(22) Filed: May 21, 2014

(65) Prior Publication Data

US 2015/0340671 A1  Nov. 26, 2015

(51) Int. Cl.

| | |
|---|---|
| *H01M 2/10* | (2006.01) |
| *B60L 11/18* | (2006.01) |
| *H01M 10/625* | (2014.01) |
| *H01M 10/613* | (2014.01) |
| *H01M 10/6562* | (2014.01) |
| *H01M 2/04* | (2006.01) |
| *H01M 2/02* | (2006.01) |
| *H01M 10/647* | (2014.01) |

(52) U.S. Cl.
CPC ............ *H01M 2/1077* (2013.01); *B60L 11/18* (2013.01); *H01M 10/613* (2015.04); *H01M 10/625* (2015.04); *H01M 10/6562* (2015.04); *H01M 2/0237* (2013.01); *H01M 2/0245* (2013.01); *H01M 2/043* (2013.01); *H01M 2/0434* (2013.01); *H01M 2/1072* (2013.01); *H01M 10/647* (2015.04); *H01M 2220/20* (2013.01); *Y10T 29/4911* (2015.01)

(58) Field of Classification Search
CPC ........... H01M 2/0237; H01M 2/0245; H01M 2/043; H01M 2/0434; H01M 2/1072
See application file for complete search history.

(56) References Cited

U.S. PATENT DOCUMENTS

| | | | |
|---|---|---|---|
| 7,264,901 B2 | 9/2007 | Gow et al. | |
| 2006/0152906 A1* | 7/2006 | Miller | .......................... 361/716 |
| 2010/0297486 A1* | 11/2010 | Fujii | ............................. 429/120 |
| 2012/0129024 A1 | 5/2012 | Marchio et al. | |
| 2012/0177952 A1 | 7/2012 | Maguire et al. | |
| 2012/0315508 A1* | 12/2012 | Kurita | ................................ 429/7 |
| 2014/0295227 A1* | 10/2014 | Aoki | ................... H01M 2/1016 429/82 |
| 2014/0356664 A1* | 12/2014 | Jung | ............................... 429/82 |
| 2015/0079451 A1* | 3/2015 | Jeong et al. | .................. 429/151 |

* cited by examiner

*Primary Examiner* — Jeremiah Smith
(74) *Attorney, Agent, or Firm* — David B. Kelley; Brooks Kushman P.C.

(57) ABSTRACT

A vehicle traction battery cell retainer includes a sidewall defining a plurality of windows each surrounded by a window flange extending therefrom, a top channel extending from the sidewall and terminating in a top flange, and a bottom channel extending from the retainer sidewall, defining a plurality of air bypass windows, and terminating in a bottom flange, the top and bottom flanges arranged for interlocking with an adjacent retainer of the traction battery. A vehicle traction battery assembly includes first and second adjacent battery cell arrays each having associated first and second retainers having a sidewall defining air flow windows and integrated top and bottom channels formed of unitary construction with interlocking flanges to couple the first and second arrays.

15 Claims, 4 Drawing Sheets

DEVICES AND METHODS FOR RETAINING BATTERY CELLS OF TRACTION BATTERIES

TECHNICAL FIELD

The present disclosure relates to devices and methods for retaining battery cells, such as the battery cells in traction batteries of hybrid or electric vehicles.

BACKGROUND

Traction batteries, such as those in hybrid or electric vehicles, consist of interconnected battery cells. The battery cells of lower voltage are often connected to form high voltage arrays. The battery cells of the arrays may be joined together by upper and lower rails that are connected by fasteners, column ties, plates, and/or a housing. Column ties may require a substantial amount of assembly time and expense. They may not adequately withstand significant loads and may deform over time. It is desirable to have devices and methods for retaining the battery cells of an array that require less assembly time, can withstand significant loads or impact, and can prevent bowing or deformation. It is also desirable to have devices and methods for retaining the battery cells of an array that can meet certain battery requirements.

The above problems and other problems are addressed by this disclosure as summarized below.

SUMMARY

In one embodiment, a vehicle traction battery cell retainer includes a sidewall defining a plurality of windows each surrounded by a window flange extending therefrom, a top channel extending from the sidewall and terminating in a top flange, and a bottom channel extending from the retainer sidewall, defining a plurality of air bypass windows, and terminating in a bottom flange, the top and bottom flanges arranged for interlocking with an adjacent retainer of the vehicle traction battery. The retainer may include a first contoured section between the sidewall and the top flange and a second contoured section between the sidewall and the bottom flange. The first contoured section and the second contoured section may be adapted to cooperate with edges of a plurality of vehicle traction battery cells. The sidewall, top channel, and bottom channel may be formed from a single material of unitary construction, such as by stamping, for example. The plurality of windows may include windows of alternating shapes and/or sizes.

In various embodiments, the retainer may include flanges having at least one tab adapted to interlock with a flange of a neighboring retainer. The retainer may also include a plurality of integrated reinforcing ribs formed between the top channel and the top flange.

One embodiment of a vehicle traction battery assembly includes first and second adjacent battery cell arrays each having associated first and second retainers having a sidewall defining air flow windows and integrated top and bottom channels formed of unitary construction with interlocking flanges to couple the first and second arrays.

Embodiments according to the present disclosure may provide various advantages. For example, the use of the single-piece retainer reduces the manufacturing assembly time and costs relative to previous strategies employing the use of column ties or multi-piece fasteners in assembling vehicle traction batteries. Air bypass windows within bottom channels of retainers according to various embodiments reduce temperature variation between cells in a particular array and between cells of adjacent arrays.

DETAILED DESCRIPTION

As required, detailed embodiments of the present disclosure are described herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

Figure 1:
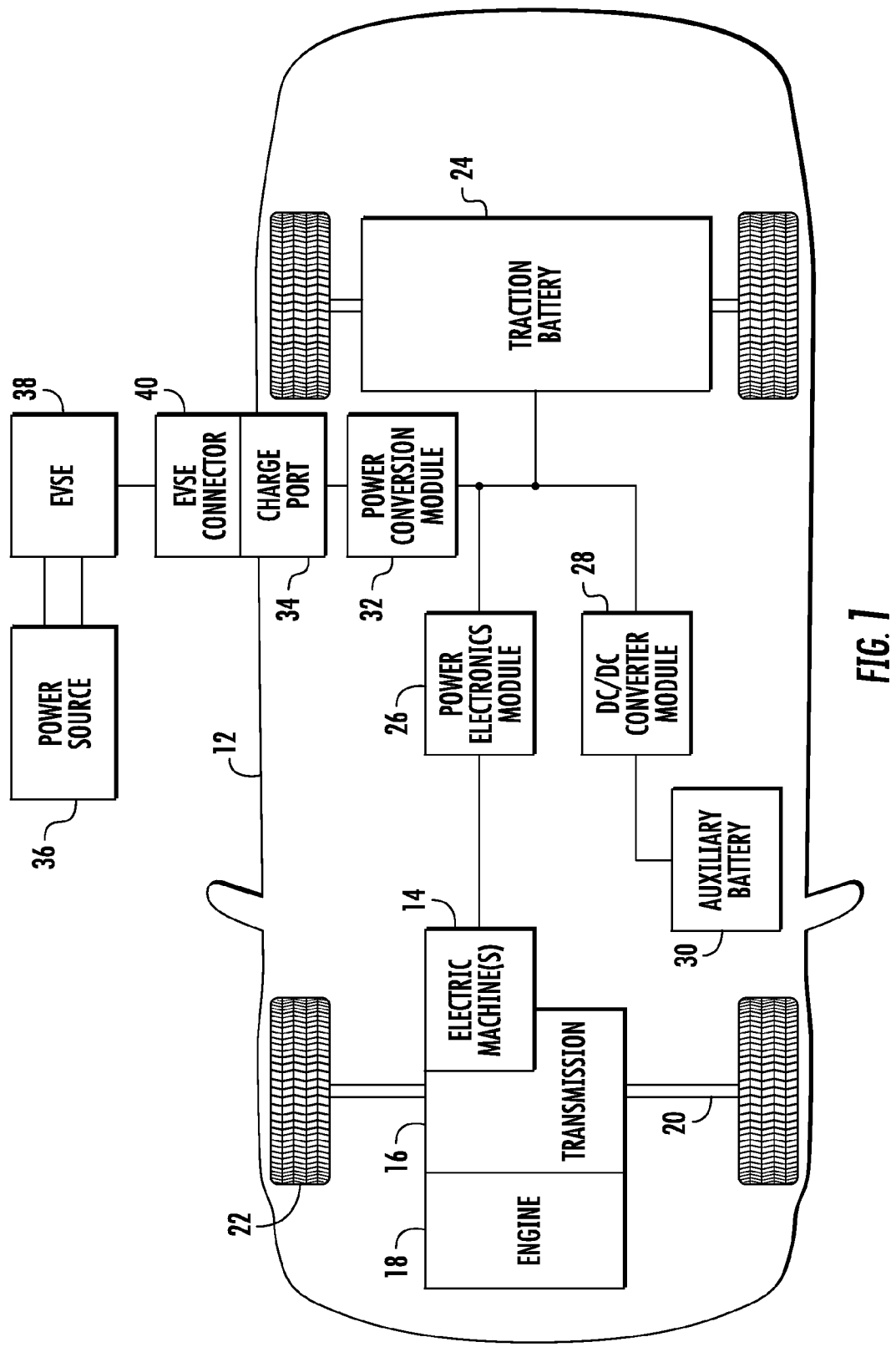
FIG. 1 depicts a representative hybrid-electric vehicle (HEV), such as a plug-in hybrid-electric vehicle (PHEV) or full hybrid-electric vehicle (FHEV) having a vehicle traction battery with retainers according to embodiments of the present disclosure.

FIG. 1 depicts a typical hybrid-electric vehicle (HEV), such as a PHEV, for example. A hybrid-electric vehicle 12 may comprise one or more electric machines 14 mechanically connected to a transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A vehicle fraction battery or battery pack 24 stores energy that can be used by the electric machines 14. A vehicle battery pack 24 typically provides a high voltage DC output. The vehicle traction battery 24 is electrically connected to one or more power electronics modules. One or more contactors (not shown) may isolate the vehicle traction battery 24 from other components when opened and connect the vehicle traction battery 24 to other components when closed. The power electronics module 26 is also electrically connected to the electric machines 14 and provides the ability to bi-directionally transfer energy between the vehicle traction battery 24 and the electric machines 14. For example, a typical vehicle traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the vehicle traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the vehicle traction battery 24 may provide energy for other vehicle electrical systems. A typical system may include a DC/DC converter module 28 that converts the high voltage DC output of the vehicle traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be any vehicle with an electrified powertrain, such as an FHEV. The vehicle 12 may also be any vehicle that includes a battery assembly made of multiple prismatic battery cells. The vehicle 12 may further be an electric vehicle, PHEV, or similar vehicle in which the vehicle traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the vehicle traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

The various components discussed may have one or more associated controllers to control and monitor the operation of the components. The controllers may communicate via a serial bus (e.g., Controller Area Network (CAN)) or via discrete conductors.

Figure 2:
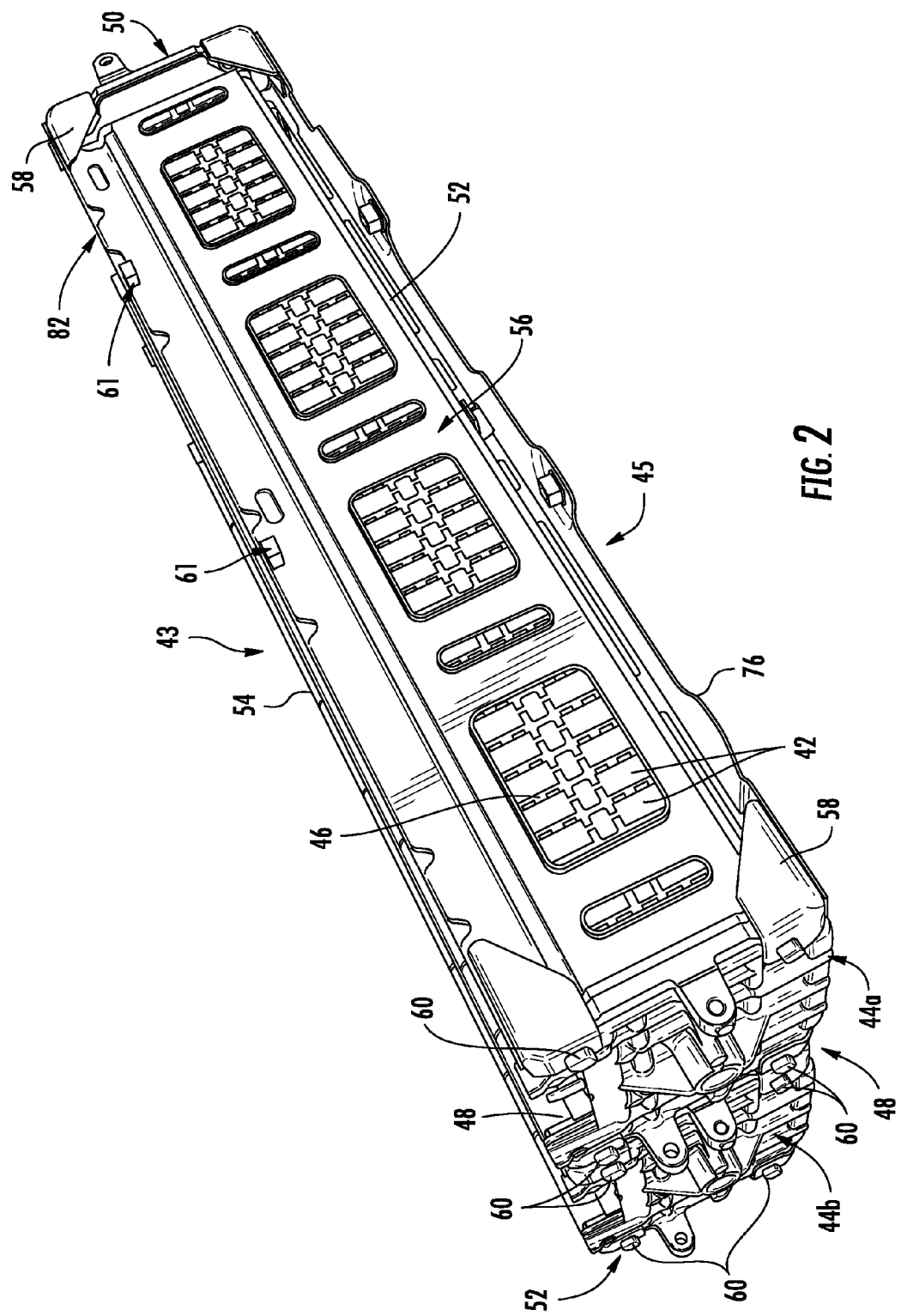
FIG. 2 is a perspective view of a vehicle traction battery assembly having a retainer according to one embodiment of the present disclosure.
Figure 4:
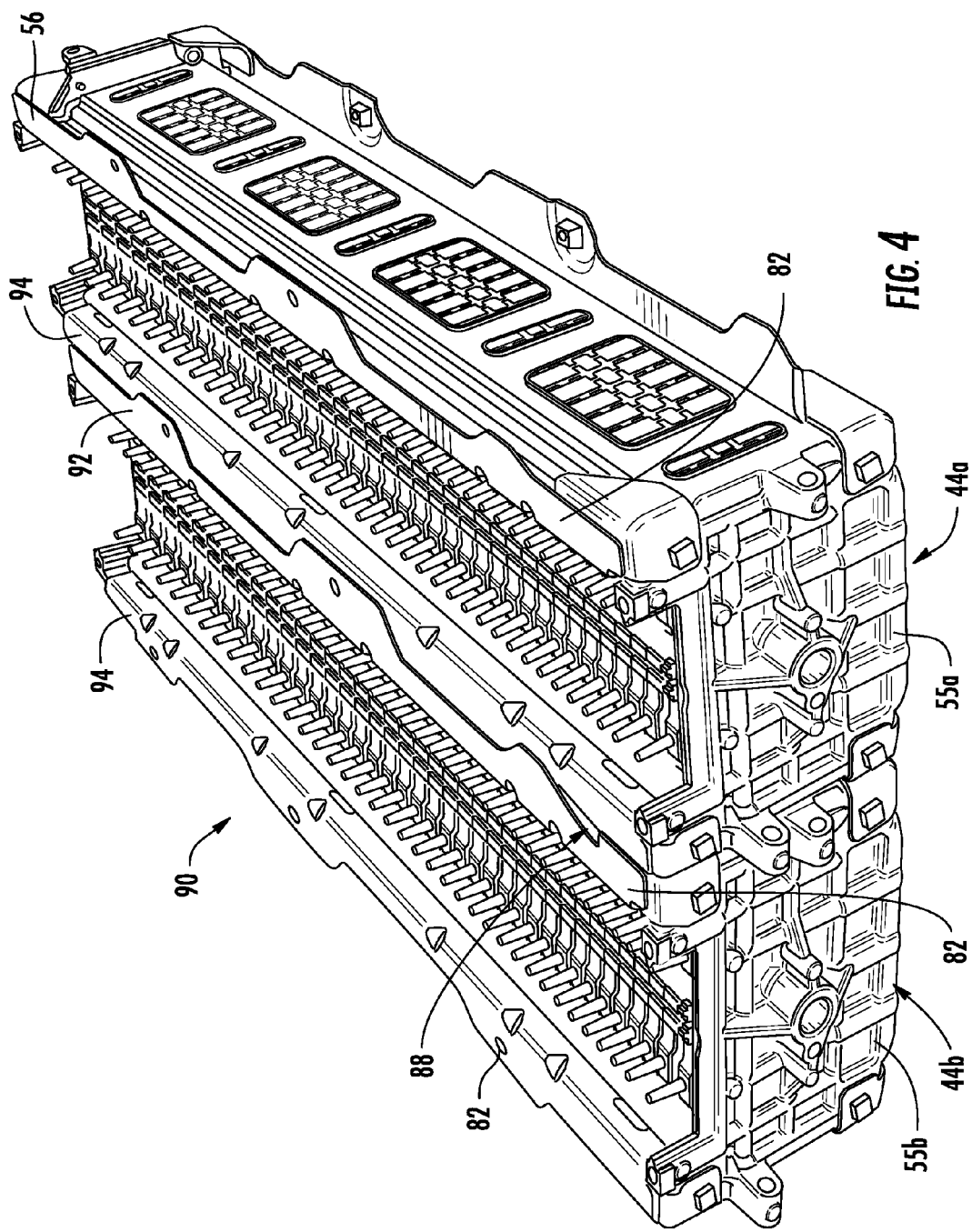
FIG. 4 is another perspective view of the vehicle traction battery assembly of FIG. 2 showing the interlocking flanges of the retaining members.

FIG. 2 and FIG. 4 depict a vehicle traction battery, such as vehicle traction battery 24 (FIG. 1) having a plurality of cells 42 arranged together to form arrays 44a and 44b that are further arranged side-to-side. The number and arrangement of the cells 42 in a particular array 44a or 44b, and the number and arrangement of arrays 44a and 44b may vary depending on the particular application and implementation. Spacers 46 are positioned between adjacent cells 42 to allow air to flow between the cells 42. The spacers 46 also serve as insulators that aid in minimizing undesired current transmission between cells 42. Each array includes a top surface 43 where the battery terminals are positioned, a bottom surface 45 opposite the top surface 43, opposing ends 48 and 50, and opposing sides 52 and 54. Opposing ends 48 and 50 are covered by end plates 55a and 55b (shown in FIG. 4), and corresponding end plates (not shown) on end 50. Opposing sides 52 and 54 of each array 44a and 44b are substantially covered by a corresponding retaining member 56. As such, the assembly illustrated in FIG. 2 includes a total of four (4) retaining members 56.

Each retaining member 56 cooperates with associated top surfaces 43 and bottom surfaces 45 of the battery cells 42 of an array 44a or 44b, for example. A gusset 58 is fastened, such as by welding, to each corner of each retaining member 56 so that each retaining member 56 includes four (4) gussets 58. A fastener 60 may be inserted through each gusset 58 to engage a corresponding threaded hole of an associated end plate 55 to secure the retaining member 56 to the end plates and thereby secure the plurality of cells 42 within the array. Several weld nuts 61 may be aligned with corresponding holes of upper flange 82 (best illustrated in FIG. 4) and lower flange 76 for subsequent use in securing adjacent arrays 44a and 44b together or in securing arrays 44a and 44b to traction battery pack structures for array retention and function. A retaining member 56 is provided for and attached to each side of each array 44a and 44b such that four retaining members 56 are utilized in the representative embodiment illustrated.

Figure 3:
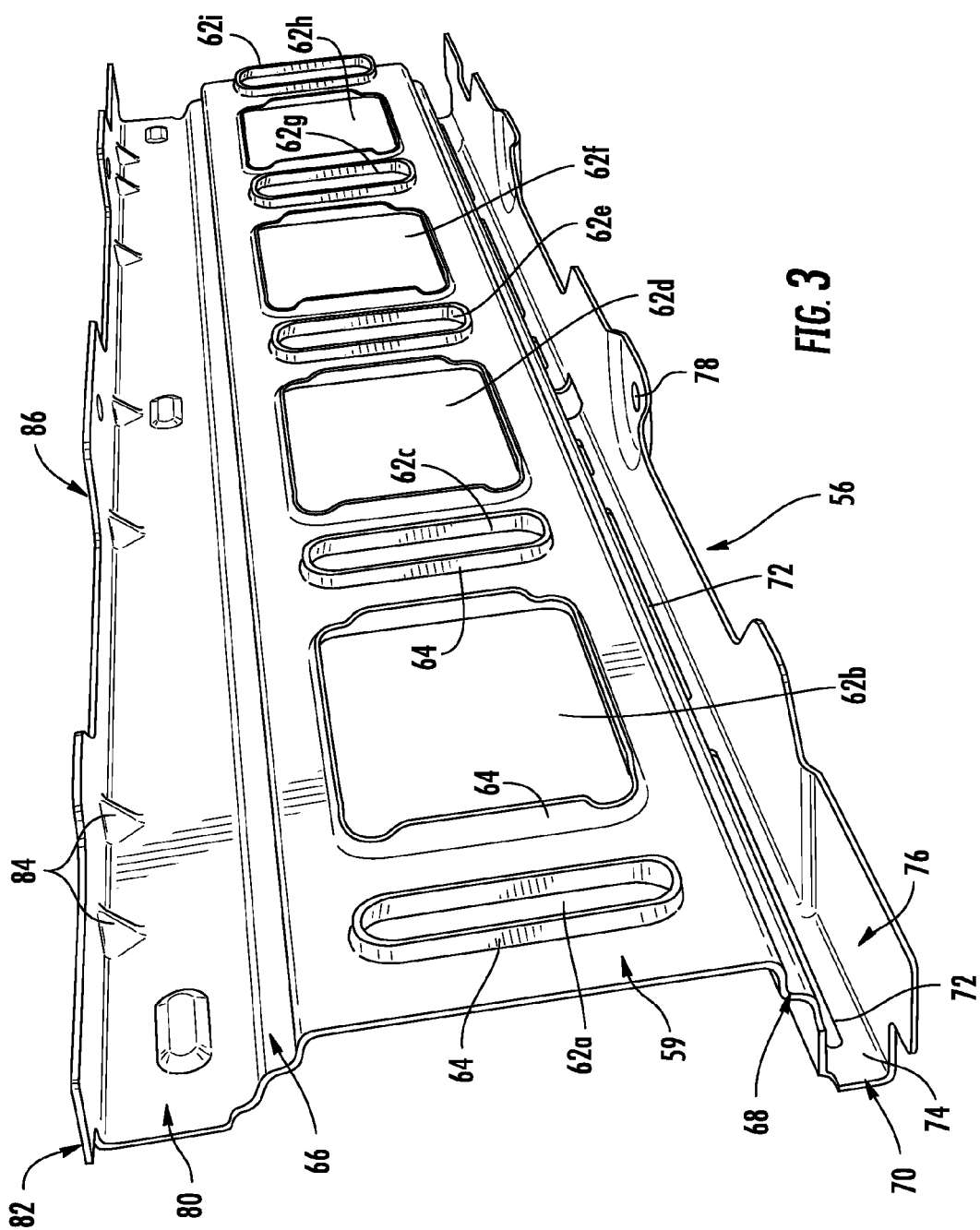
FIG. 3 is a perspective view of a retaining member as shown in FIG. 2.

The retaining member 56 includes a retaining wall or sidewall 59 that defines a series of air flow windows 62a-i (best illustrated in FIG. 3). The series of air flow windows 62a-i may include windows of different sizes and/or shapes arranged in any order to provide desired cooling airflow for associated battery cells 42. In the representative embodiment illustrated, oval-shaped windows 62a, 62c, 62e, 62g, 62i are arranged in an alternating fashion with generally rectangular-shaped windows 62b, 62d, 62f, and 62h. A lower channel 70 is integrally formed of unitary construction and extends from the retaining wall 59 and defines several air bypass windows 72. The air bypass windows 72 cooperate with the air flow windows 62a-i of the retaining members 56 attached to each side of the arrays 44a and 44b to provide cooling of the plurality of battery cells 42 to reduce temperature variations among the cells. The air flow windows 62a-i may be reconfigured or completely deleted depending on pack flow path requirements or for liquid-cooled or refrigerant-cooled traction battery packs, for example.

FIG. 3 provides a close-up view of a representative retaining member 56 according to one embodiment. Retaining member 56 may include various features or sections that are integrally formed in a unitary construction from a substantially homogenous material, such as sheet metal, for example. In the embodiment illustrated in FIG. 3, retaining member 56 includes a retaining wall 59 that defines a series of air flow windows 62a-i each surrounded by an associated flange 64. The series of air flow windows may have a design pattern, such as a repeating series of oblong-shaped window 62a followed by a rectangular-shaped window 62b and so on as previously described. The shape, orientation, and positioning of windows may vary by application to provide desired passive and/or forced air cooling of battery cells within the arrays. Windows 62a-i may be stamped, die cut, or otherwise formed in or from retaining wall 59. Windows 62a-i may have stiffening flanges 64 surrounding them. The stiffening flanges 64 protrude from the retaining wall 59 and surround the openings of the windows 62a-i. Stiffening flanges 64, such as those surrounding the rectangular-shaped windows may include portions having different height or depth relative to other portions that may depend on the particular shape and arrangement of associated battery cells 42 or various application specific packaging considerations.

The stiffening flanges 64 provide additional structural support to the retaining member 56 to allow it to withstand load or impact and prevent the retaining member 56 from bowing or deforming while retaining the cells during battery operation, shipping, and handling.

The retaining member 56 has a first contoured section 66 extending from the top portion of the retaining wall 59 and a second contoured section 68 extending from the bottom portion of the retaining wall 59. The first contoured section 66 and the second contoured section 68 cooperate with the edges of the battery cells and spacers to allow the retaining member 56 to integrate with the array and secure the battery cells. In certain embodiments, the first contoured section 66 and the second contoured section 68 may allow the retaining member 56 to snap fit into the array.

The second contoured section 68 extends into an integrally formed channel 70 of unitary construction with contoured section 68 and retaining wall 59. The channel 70 includes a U-shaped or C-shaped cross section with a substantially vertical portion 74 connecting a flange 76. The substantially vertical portion 74 defines a plurality of air bypass windows 72 that cooperates with the plurality of air flow windows 62a-i to provide cooling of the battery cells 42 within the arrays. In one embodiment, the height of the air bypass windows is about 5 mm. Flange 76 may include one or more raised or lowered portions that may contain mounting holes 78. The lowered portions may function as the foot, floor, or mounting surface of the vehicle traction battery. Mounting holes 78 allow the vehicle traction battery to be mounted to a surface, such as a supporting structure within a traction battery pack or a floor panel of a vehicle.

As also illustrated in FIGS. 2 and 3, the first contoured section 66 extends to an upper side wall 80 then to a top flange 82. Several V-shaped reinforcing ribs 84 are integrally formed of unitary construction with upper side wall 80 and top flange 82 to support the top flange 82. The top flange 82 includes a plurality of extensions or tabs 86, some of which may include a hole and associated weld nut as previously described. Extensions or tabs 86 are positioned or arranged to cooperate with complementary tabs or extensions formed by the top flange of a neighboring retaining member such that they would interlock and form a substantially flat and continuous surface. The extensions or tabs 86 provide additional structural support to subassemblies having multiple adjacent arrays. In certain embodiments, the extension or tabs 86 may not interlock with the top flange of a neighboring retainer member. They may nest within one another for tighter packaging.

Referring to FIG. 4, interlocking top flanges 82 of neighboring retainer members 56 form a substantially flat and continuous surface 88. The vehicle traction battery assembly 90 includes retainer members 56 that are attached to the sides 52, 54, 92, and 94 of each array. In one embodiment, each of the retainer members 56 is formed from a single piece stamped material of unitary construction that has stamped or die cut windows designed to withstand load or impact and prevent bowing or deformation. The use of the single-piece retainer members 56 reduces the manufacturing assembly time and costs associated with the use of column ties or multi-piece fasteners in assembling vehicle traction batteries.

Thermal analysis performed has indicated more uniform cooling of the cells and a more thermally balanced vehicle traction battery assembly that utilizes the present disclosure than existing vehicle traction batteries. The present disclosure provides devices and methods for retaining the battery cells of an array that require less assembly time, can withstand significant loads or impact, and can prevent bowing or deformation. The present disclosure further provides devices and methods for retaining the battery cells of an array that can meet certain battery transportation standards, such as Section 38.3 of the United Nations' Manual of Tests and Criteria (also known as Un38.3).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle traction battery cell retainer, comprising:
a sidewall defining a plurality of windows, each surrounded by a window flange extending therefrom,
a top channel extending from the sidewall and terminating in a top flange, and
a generally U-shaped bottom channel extending from the sidewall, defining a plurality of air bypass windows, and terminating in a bottom flange, the top and bottom flanges arranged for interlocking with an adjacent retainer of a vehicle traction battery.

2. The retainer of claim 1 further comprising a first contoured section between the sidewall and the top flange and a second contoured section between the sidewall and the bottom flange, the first contoured section and the second contoured section adapted to cooperate with edges of a plurality of vehicle traction battery cells.

3. The retainer of claim 1 wherein the sidewall, top channel, and bottom channel are formed from a single material of unitary construction.

4. The retainer of claim 1 wherein the plurality of windows includes windows of alternating shapes.

5. The retainer of claim 1 wherein the top flange comprises at least one tab adapted to interlock with a flange of a neighboring retainer.

6. The retainer of claim 1 further comprising a plurality of integrated reinforcing ribs formed between the top channel and the top flange.

7. The retainer of claim 1 wherein the sidewall, the top channel, and the bottom channel are formed from a single piece of stamped metal.

8. A vehicle traction battery assembly comprising:
a first battery cell array having first and second retainers;
a second battery cell array positioned adjacent to the first battery cell array and having third and fourth retainers;
wherein each of the first, second, third, and fourth retainers includes a sidewall defining air flow windows and having integrated top and bottom channels formed of unitary construction with interlocking flanges to couple the first and second arrays, and
wherein each of the bottom channels of the retainers is generally U-shaped and includes at least one air bypass window.

9. The vehicle traction battery assembly of claim 8 wherein each of the air flow windows is surrounded by a flange protruding from the sidewall.

10. The vehicle traction battery assembly of claim 8 wherein the retainers are formed by stamping.

11. The vehicle traction battery assembly of claim 10 further comprising a plurality of integrated reinforcing ribs extending between the interlocking flanges and respective sidewalls.

12. The vehicle traction battery assembly of claim 8 wherein each of the retainers includes a first contoured section between the sidewall and the top channel, a second contoured section between the sidewall and the bottom channel, the first contoured section and the second contoured section cooperating with respective battery cells.

13. A method of assembling a traction battery comprising:
   connecting battery cells to form an array; and
   attaching first and second retainers to opposite sides of the array, each retainer comprising a wall that defines a window having a flange, a first flange extending from a first end of the wall, and a second flange extending from an end opposite the first end, the second flange defining a U-shaped channel having an air bypass window.

14. The method of claim 13 further comprising welding a gusset to top and bottom ends of the first and second retainers.

15. The method of claim 14, further comprising:
   connecting a plurality of cells to form a second array, the second array having a first side and a second side;
   attaching a third retainer to the first side of the second array;
   attaching a fourth retainer to the second side of the second array, the third and fourth retainers being the same shape as the first and second retainers; and
   connecting the array and the second array.

* * * * *